Oct. 5, 1965  R. L. CUMMINGS  3,210,553
TURBOELECTRIC POWER SYSTEM
Filed Jan. 30, 1961  4 Sheets-Sheet 2
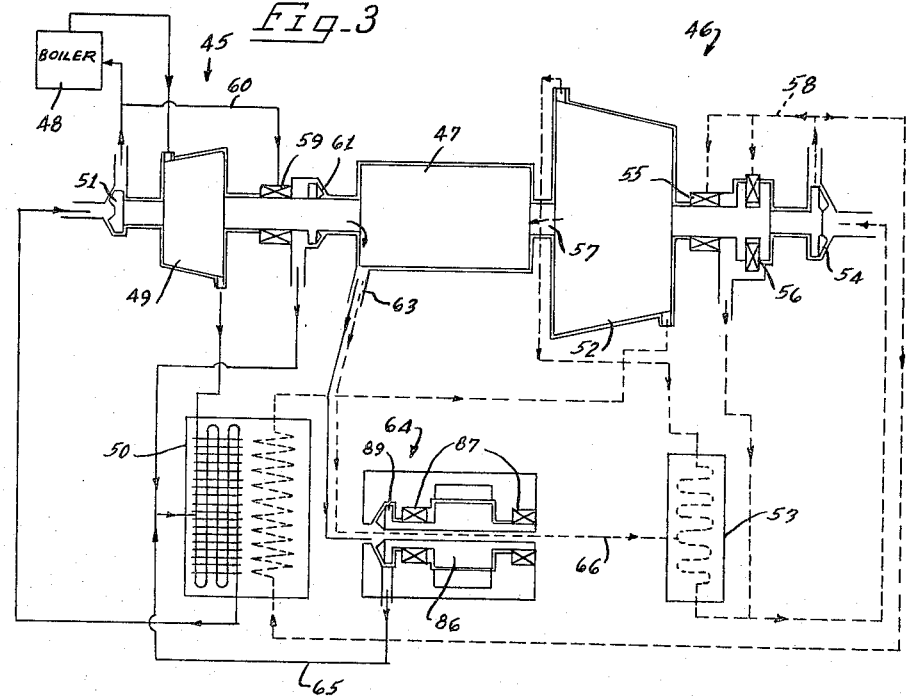
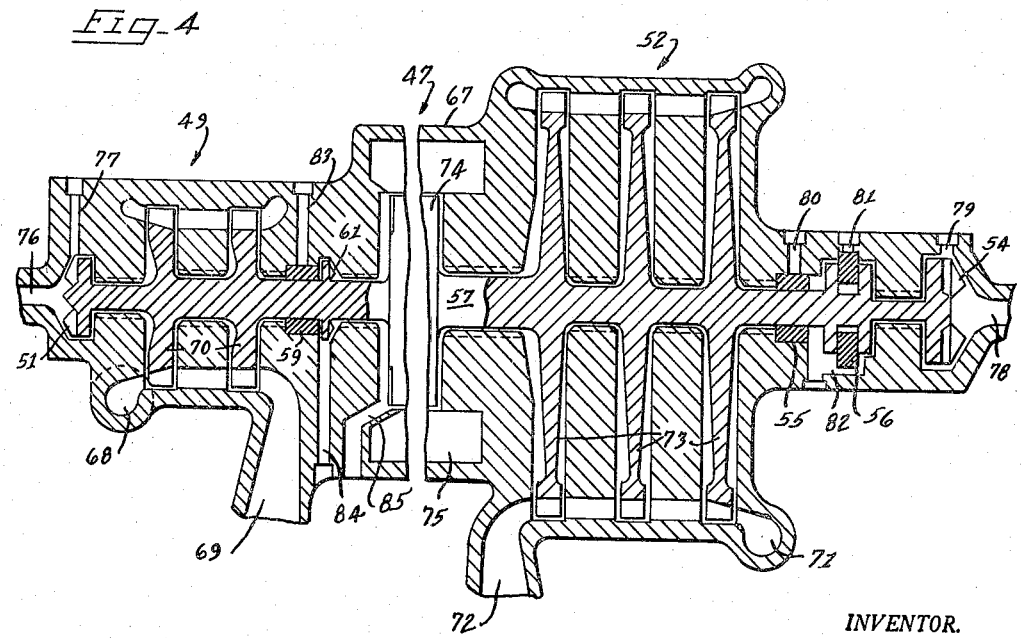
INVENTOR.
Robert L. Cummings

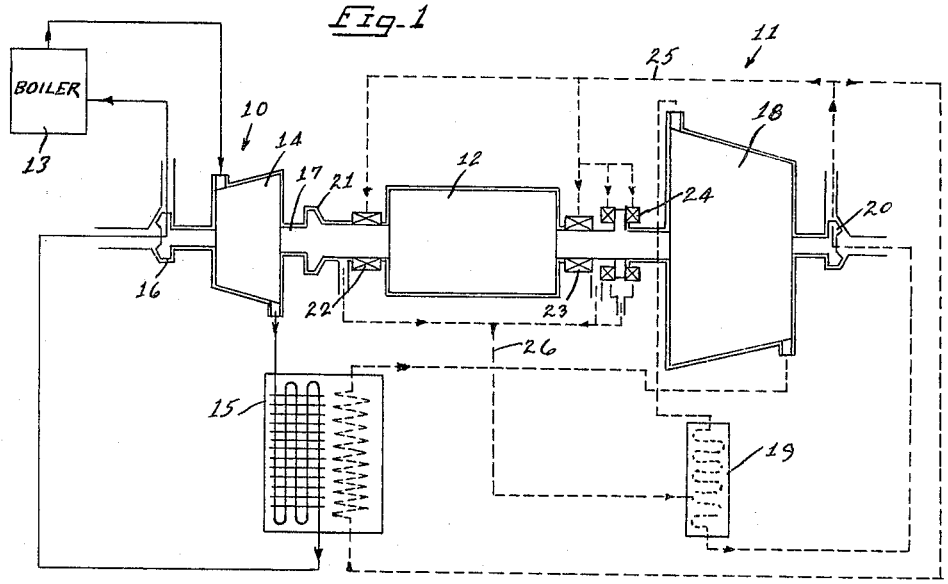

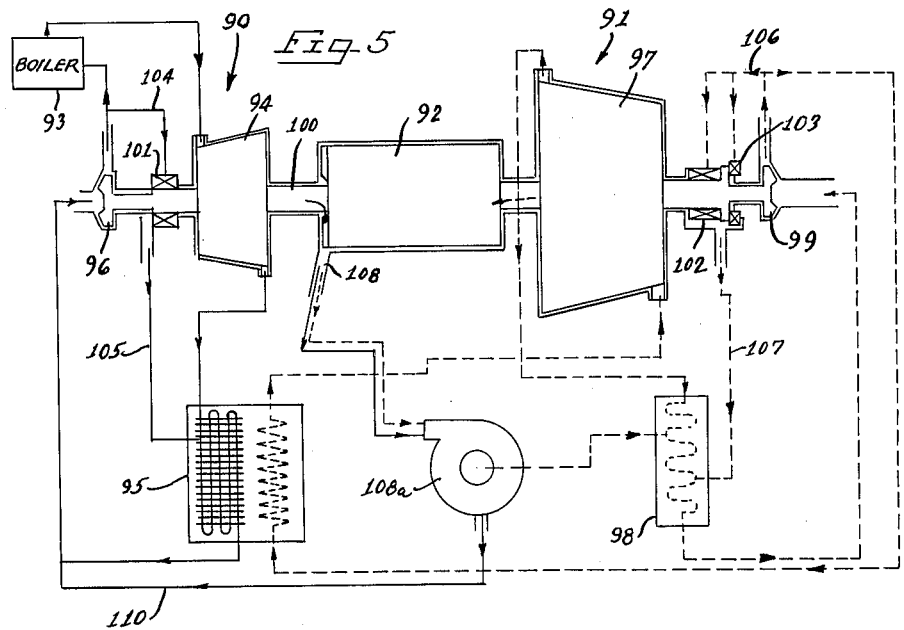
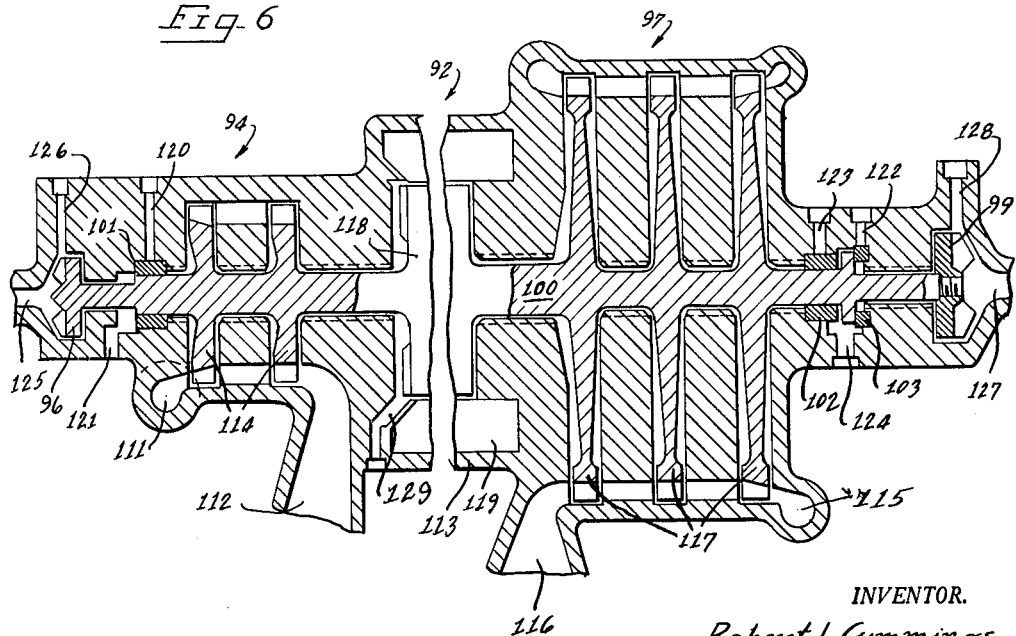

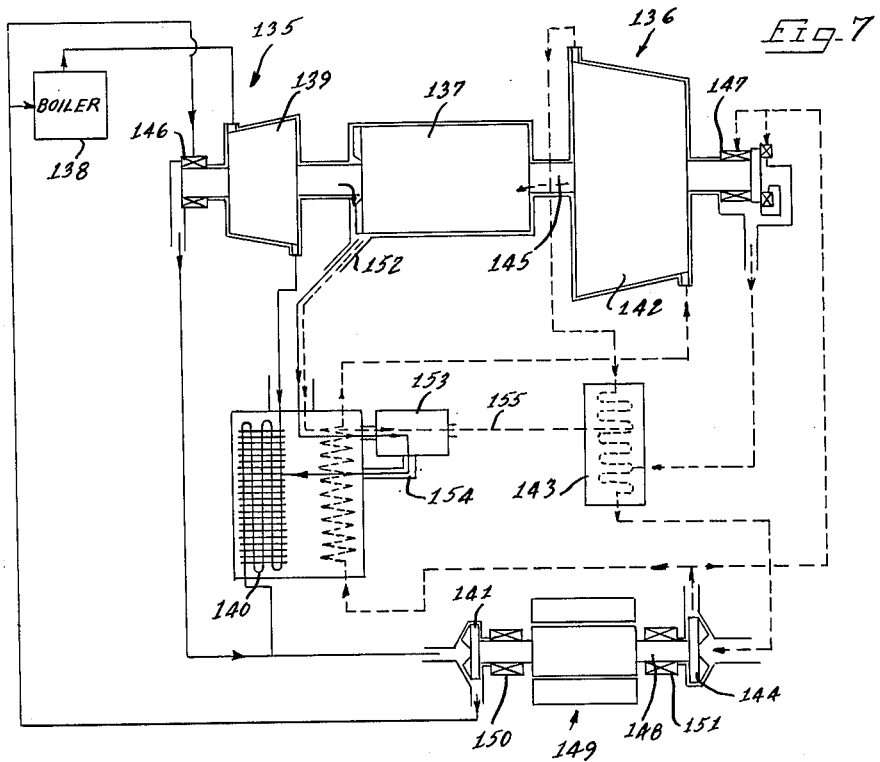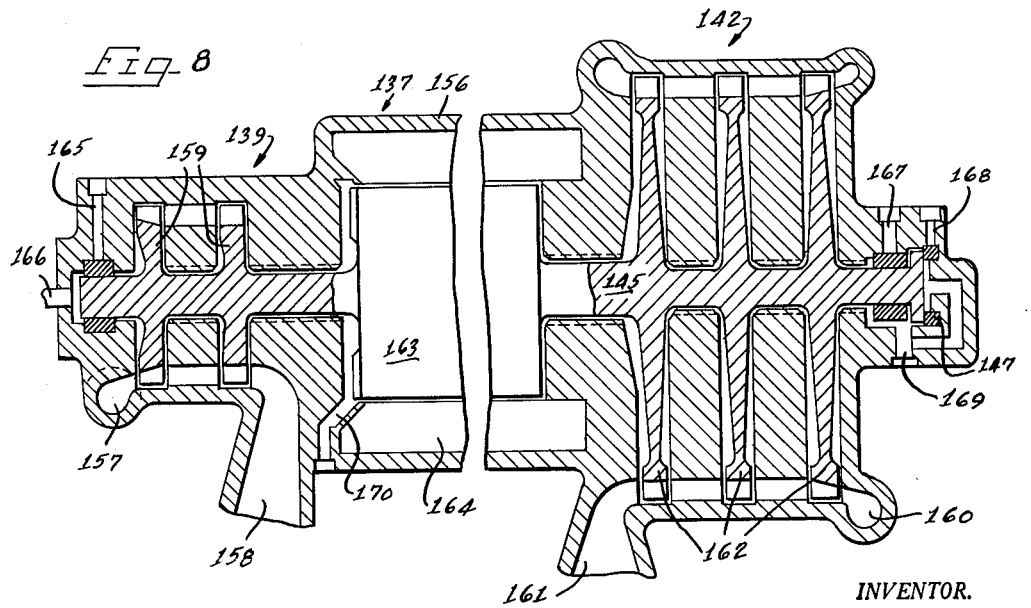

United States Patent Office 3,210,553
Patented Oct. 5, 1965

3,210,553
TURBOELECTRIC POWER SYSTEM
Robert L. Cummings, Wickliffe, Ohio, assignor to
TRW Inc., a corporation of Ohio
Filed Jan. 30, 1961, Ser. No. 85,718
7 Claims. (Cl. 290—4)

This invention relates to Rankine cycle turboalternator power systems and, more particularly, to such a system wherein an electric generator and two turbines are mounted on one shaft in a sealed housing and the turbines are adapted to utilize different working fluids.

While water has been commonly used to convert thermal energy into electrical energy it has proven to be inadequate where higher pressures and temperatures are desired. One solution to this problem has been the use of two fluid or binary cycles. The two fluids commonly used have been mercury and water and the systems have been such that the vapors of these two materials have been fed to two different turbines which have been coupled to separate electric generators.

In accordance with this invention, a binary fluid cycle is provided wherein one electric generator and two turbines are mounted on a single shaft and the unit is enclosed in a hermetically sealed housing. Various mixture separating and fluid sealing devices are employed which permit the thermodynamic advantages of the binary fluid cycle to be obtained along with the advantages inherent in using a single electric generator.

Accordingly, it is an object of this invention to provide a binary fluid cycle power system of the type described which is very efficient, lightweight and reliable.

It is another object of this invention to provide such a system wherein two turbines deliver power to a single electric generator and the generator operates at relatively low temperatures.

It is another object of this invention to provide such a system which requires only a single set of bearings which may be lubricated with the fluid having the best lubrication qualities.

It is still another object of this invention to provide a binary fluid cycle power system which is very simple to start up and control since only one generator is used, which eliminates the necessity of synchronizing the frequency and phase angle of two separate generators.

It is still another object of this invention to provide a binary fluid cycle power system which can be easily installed in space vehicles because the relatively low temperature fluid can be chosen to be a fluid which is compatible with lightweight materials.

Other objects, features and advantages of the present invention will be apparent from the following detailed description taken in conjunction with accompanying figures of the drawings, in which:

FIGURE 1 is a diagrammatic illustration of one embodiment of the invention wherein two turbines and a generator are mounted on one shaft and means are provided to prevent the two working fluids from entering the generator;

FIGURE 2 is a detailed illustration of a portion of the system illustration in FIGURE 1;

FIGURE 3 is a diagrammatic illustration of another embodiment of the invention wherein one working fluid circulates through the generator, and a liquid-vapor shaft seal and a mixture separator are provided;

FIGURE 4 is a detailed illustration of a portion of the system illustrated in FIGURE 3;

FIGURE 5 is a diagrammatic illustration of another embodiment of the invention wherein the two working fluids are mixed and are later separated by a separator;

FIGURE 6 is a detailed illustration of a portion of the system illustrated in FIGURE 5;

FIGURE 7 is a diagrammatic illustration of another embodiment of the invention wherein the two working fluids mix and a combination separator, condenser and boiler is provided; and FIG. 8 is a detailed illustration of a portion of the system illustrated in FIGURE 7.

As shown on the drawings:

The embodiment of the invention illustrated in FIGURES 1 and 2 includes two systems 10 and 11 which are coupled to drive a single electric generator or alternator 12. The system 10 employs a first working fluid at a relatively high temperature and pressure, and includes a boiler 13, a turbine 14, a condenser-boiler 15, and a pump 16 which circulates the first working fluid through these components. The turbine 14 and the pump 16 are mounted on a shaft 17 which also supports the alternator 12.

The system 11 employs a second working fluid at a relatively low temperature and pressure, and includes a turbine 18, a condenser 19, the condenser-boiler 15, and a pump 20 which circulates the second working fluid through these components.

The boiler 13 may be a conventional nuclear reactor, solar source, etc.

A rotating liquid shaft seal 21 and a sleeve bearing 22 are mounted on the shaft 17 between the alternator 12 and the turbine 14. Between the alternator 12 and the turbine 18 is fastened a sleeve bearing 23 and a thrust bearing 24. A portion of the fluid output from the pump 20 is fed through a conduit 25 to the bearings 22, 23 and 24 and is used as a lubricant. The drain from these three bearings is fed into the condenser 19 by a conduit 26.

With specific reference to FIGURE 2, the turbines 14 and 18 and the alternator 12 are mounted in a hermetically sealed housing 27. The turbine 14 for the first working fluid includes a high pressure fluid inlet 28, a plurality of turbine blades 29 which are fastened to the shaft 17, and an exhaust port 30 which leads to the condenser-boiler 15. The turbine 18 for the second working fluid likewise includes a fluid inlet 31, a plurality of turbine blades 32 which are fastened to the shaft 17, and an exhaust port 33 which leads to the condenser 19. The turbine rotor blades 29 and 32 are fixed to the shaft 17 and drive the rotor 34 for the alternator 12. The stator 35 for the alternator 12 is fixed to the housing 27.

If necessary, suitable provision may be made in practice to prevent the liquid from the two bearings 22 and 23 from leaking into the cavity of the alternator rotor 34. Also, the pressure and the temperature of this cavity may be controlled by suitable means to allow the rotor 34 to operate in a low temperature vapor atmosphere.

The housing 27 is also equipped with a plurality of fluid passageways which lead to the pumps 16 and 20 and to the bearings. The low pressure side of the pump 16 is connected to a passageway 36 which connects to the outlet of the condenser-boiler 15, and the high pressure side of this pump is connected to a passageway 37 which leads to the boiler 13. A passageway 38 connects the low pressure side of the pump 20 to the condenser 19 and a passageway 39 connects the high pressure side of this pump 20 to the condenser-boiler 15. Lubricant for the bearing 22 is obtained from a passageway 40 which leads to the conduit 25, and the drain from this bearing is carried away by a passageway 41 which is coupled to the conduit 26. A fluid passageway 42 carries lubricant to the sleeve bearing 23 and the thrust bearing 24 from the conduit 25 and a passageway 43 carries the drain from these two bearings to the conduit 26.

In operation, the first working fluid is heated by a conventional heat source in the boiler 13 until it forms a high temperature and pressure vapor. This vapor passes from the boiler 13 to the turbine 14 where a portion of its thermal energy is converted into rotary mechanical energy. The exhaust from the turbine 14 is fed into the condenser-boiler 15 where it is reduced to a fluid which is returned to the boiler 13 by the pump 16.

The heat that is extracted from the first working fluid in the condenser-boiler 15 is used to heat the second working fluid to a high temperature and pressure vapor. This latter vapor is fed to the turbine 18 where a portion of its thermal energy is converted into rotary mechanical energy. The exhaust vapor leaving the turbine 18 is returned to a liquid by the condenser 19 before it is returned to the condenser-boiler 15 by the pump 20.

The rotating liquid shaft seal 21 prevents the two working fluids from mixing, and the second working fluid which is injected into the bearings 22, 23 and 24, which may be conventional types, under pressure provides lubrication for the shaft 17.

Typical fluids for use in this invention are mercury and water which have been commonly used in binary cycles. However, other fluids can be used which can be prevented from mixing.

By providing a binary fluid cycle of the type described wherein two turbines deliver power to a single electrical generator, very high efficiency is achieved with a very compact and reliable system. As can be seen, only a single set of bearings is required which can be lubricated with the fluid having the best lubrication qualities. Further, since only a single alternator is used the problem of synchronizing frequencies and phase angles is eliminated.

The embodiment of the invention illustrated in FIGURES 3 and 4 is also a binary fluid cycle system but it differs from the previous embodiment primarily in that vapors of the lower temperature working fluid from the cavity of the alternator rotor are permitted to mix with liquid of the higher temperature working fluid. This embodiment of the invention also includes a first system 45 which employs a first high temperature and pressure working fluid and a second system 46 which employs a second working fluid which is at a relatively low temperature and pressure level. Both of these systems 45 and 46 are connected to drive an alternator 47.

The first system 45 includes a boiler 48, a turbine 49, a condenser-boiler 50, and a pump 51 which circulates the first working fluid through these components. The second system 46 again includes a turbine 52, a condenser 53, the condenser-boiler 50, and a pump 54 which circulates the second working fluid through these components.

A sleeve bearing 55 and a thrust bearing 56 are mounted between the turbine 52 and the pump 54 on the shaft 57 which supports the two turbines 49 and 52 and the alternator 47. These two bearings 55 and 56 are lubricated by the second working fluid which is fed to these two bearings by a conduit 58 that is connected to the output of the pump 54. The drain from the two bearings 55 and 56 is connected to the output side of the condenser 53.

A sleeve bearing 59 is also provided between the turbine 49 and the alternator 47 which is lubricated by the first working fluid. This first working fluid is chosen to be the higher temperature fluid. A conduit 60 is connected between the bearing 59 and the output of the pump 51. A rotating liquid centrifugal separator 61 is also provided on the shaft 57 between the bearing 59 and the alternator 47.

Since there isn't a seal between the turbine 52 and the alternator 47 a portion of the vapor leaves the turbine 52 and enters the alternator 47 enclosure. This vapor mixes with the first working fluid in liquid form on the turbine 49 side of the alternator 47. The mixture of these two working fluids is drained out of the alternator 47 enclosure by a conduit 63 which leads to a rotating separator 64. This separator is a conventional type that is adapted to separate the first working fluid which is in liquid form from the second working fluid which is in vapor form. It includes an electric motor 86 that is mounted on bearings 87 in a housing 88. A rotating member 89 attached to the motor 86 separates the two fluids. The first working fluid is carried away from the separator 64 by a conduit 65 to the condenser-boiler 50. The second working fluid is carried away from the separator 64 by a second conduit 66 which leads to the condenser 53.

With reference to FIGURE 4, the alternator 47, the two turbines 49 and 52, the two pumps 51 and 54, and the bearings are all mounted in a single housing 67. The turbine 49 includes a high pressure fluid inlet 68 and an exhaust port 69 which are formed in the housing 67, and a plurality of rotor blades 70 which are fastened to the shaft 57. The turbine 52 likewise includes a high pressure fluid inlet 71 and an exhaust port 72 formed in the housing 67, and a plurality of rotor blades 73 which are fastened to the shaft 57. As the first working fluid expands through the turbine 49 and the second working fluid expands through the turbine 52, a portion of its thermal energy is converted to rotary mechanical energy which drives the alternator 47. This alternator includes a rotor 74 which is mounted on the shaft 57 and a stator 75 which is fixed to the housing 67.

The fluid passageways formed in the housing 67 for the pumps 51 and 54 and the bearings include a passageway 76 which couples the low pressure side of the pump 51 to the condenser-boiler 50 and a fluid passageway 77 which couples the high pressure side of this pump 51 to the boiler 48. A fluid passageway 78 also formed in the housing 67 connects the low pressure side of the pump 54 to the condenser 53, and a fluid passageway 79 connects the high pressure side of the pump 54 to the condenser-boiler 50.

The conduit 58 connected to the output of the pump 54 is coupled to two fluid passageways 80 and 81 which lead to the bearings 55 and 56, respectively. A third passageway 82 leading to these two bearings carries the drain from these bearings to the outlet side of the condenser 53. A passageway 83 formed in the housing 67 connects the conduit 60 to the bearing 59 and the drain from this bearing is coupled by a fluid passageway 84 to the input to the condenser-boiler 50. Finally, a passageway 85 connects the alternator 47 enclosure to the conduit 63 which carries the mixture of the two working fluids to the separator 64.

In the operation of this embodiment of the invention, the first working fluid is heated to a relatively high temperature and pressure in the boiler 48 before being circulated through the turbine 49 and the condenser-boiler 50 by the pump 51. The heat extracted from the first working fluid in the condenser-boiler 50 is absorbed by the second working fluid with result that the second working fluid is converted into a vapor at a relatively lower temperature and pressure. This second working fluid is circulated through the turbine 52, the condenser 53, and the condenser-boiler 50 by the second pump 54. The expansion of these two working fluids in the two turbines 49 and 52 causes the shaft 57 and the rotor 74 of the alternator 47 to rotate, thereby generating electrical energy. The mixture of the first working fluid in liquid form and the second working fluid in vapor form is carried from the alternator 47 enclosure to the separator 64.

The embodiment of the invention illustrated in FIGURES 5 and 6 includes a first system 90 that utilizes the relatively high temperature and pressure working fluid and a second system 91 that utilizes the relatively low temperature and pressure working fluid, and a generator 92. In this embodiment of the invention, the vapors of the two working fluids mix and means are provided for separating them.

The first system 90 includes a boiler 93, a turbine 94, a condenser-boiler 95, and a pump 96 which is connected to circulate the first fluid through these components. The second system 91 also includes a turbine 97, a condenser 98, the condenser-boiler 95, and a pump 99 which is coupled to circulate the second working fluid through these components.

The alternator 92 and the two turbines 94 and 97 are mounted on a shaft 100 which is supported by two sleeve bearings 101 and 102 and a thrust bearing 103. A conduit 104 connects the output of the pump 96 to the sleeve bearing 101 and a conduit 105 carries the drain from the bearing 101 to the condenser-boiler 95. A conduit 106 connects the outlet of the pump 99 to the two bearings 102 and 103, and a second conduit 107 connects the output drain from these two bearings 102 and 103 to the condsenser 98.

Since the bearings 101, 102 and 103 are located on the sides of the turbines 94 and 97 which are away from the alternator 92, the vapor of the second working fluid is permitted to enter the alternator 92 enclosure and mix with the vapor of the first working fluid. The mixture of these two vapors is carried away from the alternator 92 enclosure by a conduit 108 which leads to the input to a static separator 108a. As a result of mixing and cooling in conduit 108 condensation is obtained of the vapors of the higher temperature working fluid. Separation of the two working fluids can therefore be achieved in the static separator 108a. This separator has two outlets, a first outlet 109 which carries the second working fluid to the condenser 98 and a second outlet 110 which carries the first working fluid to the input to the pump 96.

With reference to FIGURE 6, the turbine 94 includes a fluid inlet 111 for the first working fluid and an exhaust port 112 which are formed in the housing 113. The turbine 94 also includes a plurality of rotor blades 114 which are fastened to the shaft 100. The turbine 97 for the second working fluid includes a fluid inlet 115 and an exhaust port 116 and a plurality of rotor blades 117 which are fastened to the shaft 100. The alternator 92 includes a rotor 118, which is also mounted on the shaft 100, and a stator 119 which is fastened to the housing 113.

A plurality of passageways 120–124 are formed in the housing 113 which carry the lubricant to and from the bearings 101, 102 and 103, the first working fluid being used as a lubricant for the bearing 101 and the second working fluid being used as a lubricant for the bearings 102 and 103. Four other passageways 125–128 are also formed in the housing 113 which carry the first and second working fluids to and from the two pumps 96 and 99. Still another passageway 129 formed in the housing 13 connects the interior of the alternator 92 enclosure to the conduit 108 which leads to the separator 108a.

In the operation of the system illustrated in FIGURES 5 and 6, the first working fluid is heated by a conventional heat source in the boiler 93 and passed through the turbine 94. The condsenser-boiler 95 extracts heat from the first working fluid in order to convert the vapor to liquid form. The heat extracted from the first working fluid is employed to turn the second working fluid into a relatively low temperature and pressure vapor which is fed to the second turbine 97. The exhaust from this second turbine 97 is connected to a condenser 98 where it is cooled to liquid form before it is returned to the condenser-boiler 95 by the pump 99.

The mixture of the two vapors is carried out of the enclosure for the alternator 92 to the static steam vent separator 108a by the conduit 108. The vapor of the second working fluid is taken out of the separator 108a and combined with the remainder of the second working fluid in the condenser 98, and condensed liquid of the first working fluid is carried by the conduit 110 from the separator 108a to the input to the pump 96.

In the embodiment of the invention illustrated in FIGURES 7 and 8, the vapors of the two working fluids are again mixed and the low temperature vapor passes through the alternator enclosure. This embodiment of the invention includes a first system 135 which employs the relatively high temperature and pressure fluid and a second system 136 which employs the relatively low temperature and pressure fluid. The two systems 135 and 136 are connected to drive an alternator 137.

The system 135 includes a boiler 138, a turbine 139, a condenser-boiler-separator 140, and a pump 141 which circulates the first working fluid. The second system 136 includes a turbine 142, a condenser 143, the condenser-boiler separator 140, and a pump 144 which circulates the second working fluid.

The alternator 137 and the two turbines 139 and 142 are all mounted on a shaft 145 which is supported at one end by a sleeve bearing 142 and at the other end by a combination sleeve and thrust bearing 147. The two pumps 141 and 144 are mounted on a separate shaft 148 which is driven by a suitable electric motor 149. The shaft 148 and the motor 149, along with the pumps 141 and 144, are supported by a set of sleeve bearings 150 and 151.

The vapor of the second working fluid passes through the alternator 137 and mixes with the vapor of the first working fluid. A conduit 152 which is in communication with the interior of the alternator 137 enclosure carries this vapor mixture to the condenser-boiler-separator 140. A conventional trap 153 is formed in the condenser-boiler-separator 140 which separates the heavier first working fluid from the second working fluid vapor, and the first working fluid is returned to the condenser-boiler-separator 140 by a conduit 154 while the second working fluid is carried to the condenser 143 by a conduit 155.

With reference to FIGURE 8, a housing 156 encloses the turbine 139, the alternator 137, and the turbine 142. The turbine 139 includes a fluid inlet 157 and fluid exhaust 158 which are formed in the housing 156, and a plurality of rotor blades 159 which are fastened to the shaft 145. Likewise, the turbine 142 includes a fluid inlet 160 and an exhaust port 161 which are formed in the housing 156, and a plurality of rotor blades 162 which are fastened to the shaft 145.

As the first and second working fluids flow through the two turbines 139 and 142, a portion of their thermal energy is converted into rotary mechanical energy which rotates the shaft 145. The rotor 163 of the alternator 137 is also mounted on the shaft 145 and this rotation generates electrical energy. The stator 164 for the alternator 137 is fastened to the housing 156.

A plurality of fluid passageways 165–169 are formed in the housing 156 which carry the lubricants to and from the bearings. The first working fluid is used to lubricate the first bearing 146 and the second working fluid is used to lubricate the bearing 147. Another passageway 170 is formed in the housing 156 to carry the mixture of the two vapors out of the alternator 137 enclosure to the conduit 152.

In the operation of this embodiment, the first working fluid is again heated to vapor form in the boiler 138 by a conventional heat source and the thermal energy in this vapor is used to drive the alternator 137. The exhaust of the turbine 139 is then cooled in the condenser-boiler-separator 140 before being returned to the boiler 140. The heat extracted from the first working fluid is employed to heat the second working fluid which is passed through the turbine 142, the condenser 143, and the condenser-boiler-separator 140. The vapor mixture from the interior of the alternator 137 enclosure is also fed into the condenser-boiler-separator 140 and, as previously discussed, the vapor of the first working fluid is separated from the vapor of the second working fluid. The first working fluid is then returned to the condenser-boiler-separator 140 and the vapor of the second working fluid is fed to the condenser 143.

Although the two working fluids commonly used in binary fluid cycle systems are mercury and water, it will be apparent that any two fluids can be used which can be prevented from mixing. Conventional fluid sealing devices and mixture separating apparatuses can be selected in accordance with the properties of the working fluids to be used. The invention includes the concepts of preventing mixing by means of liquid-liquid shaft seals, liquid-vapor shaft seals, and various mixture separating apparatuses using centrifugal forces, differences in vapor pressure, or any other physical properties by which two fluids can be separated.

It will be apparent that modifications and variations may be effected without departing from the scope of the novel concepts of the present invention.

I claim as my invention:

1. A binary cycle power system comprising a hermetically sealed housing, a shaft rotatably mounted in said housing, first and second turbines and an alternator mounted on said shaft, said alternator being mounted between said first and second turbines, said first and second turbines being adapted to utilize first and second working fluids, first bearing means for said shaft between said alternator and said first turbine, second bearing means for said shaft between said alternator and said second turbine, fluid sealing means on said shaft between said first turbine and said first bearing means, means connected by a conduit to the input to said first turbine for heating said first working fluid, a condenser connected by a conduit to the output of said first turbine, said condenser being connected by a conduit to the input to said second turbine, and means to feed one of said working fluids to the first and second bearing means.

2. A binary cycle turboelectric power system comprising a hermetically sealed housing, an alternator and first and second turbines mounted on a shaft in said housing, said alternator being mounted between said first and second turbines, first bearing means for said shaft between said first turbine and said alternator, second bearing means for said shaft between said alternator and said second turbine, fluid sealing means on said shaft between said first turbine and said first bearing means, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, the output of said first condenser being connected to the input to said heating means, a fluid passageway in said first condenser for said second working fluid, said fluid passageway being connected to the input to said second turbine, the output of said second turbine being connected to a second condenser for said second working fluid, the output of said second condenser being connected through a fluid pump to said fluid passageway in said first condenser, and means coupling the output of said pump to said first and second bearing means.

3. A binary cycle turboelectric power system comprising an alternator connected to first and second turbines, first bearing means for said first turbine, second bearing means for said second turbine, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, the output of said first condenser being connected to the input to said heating means, a fluid passageway in said first condenser for said second working fluid, said fluid passageway being connected to the input to said second turbine, the output of said second turbine being connected to a second condenser for said second working fluid, the output of said second condenser being connected through a fluid pump to said fluid passageway in said first condenser, and means coupling the output of said pump to said first and second bearing means.

4. A binary cycle turboelectric power system comprising, an alternator connected to first and second turbines mounted on a shaft, first and second bearing means for said shaft, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, the output of said first condenser being connected to the input to said heating means, a fluid passageway in said first condenser for said second working fluid, said fluid passageway being connected to the input to said second turbine, the output of said second turbine being connected to a second condenser for said second working fluid, the output of said second condenser being connected through a fluid pump to said fluid passageway in said first condenser, and means coupling the output of said pump to said first and second bearing means.

5. A binary cycle turboelectric power system comprising, an alternator and first and second turbines mounted on a shaft, first and second bearing means for said shaft, fluid sealing means on said shaft between said first turbine and said first bearing means, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, the output of said first condenser being connected to the input to said heating means, a fluid passageway in said first condenser for said second working fluid, said fluid passageway being connected to the input to said second turbine, the output of said second turbine being connected to a second condenser for said second working fluid, the output of said second condenser being connected through a fluid pump to said fluid passageway in said first condenser, and means coupling the output of said pump to said first and second bearing means.

6. A binary cycle turboelectric power system comprising a hermetically sealed housing, an alternator and first and second turbines mounted on a shaft in said housing, first and second bearing means for said shaft, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, the output of said first condenser being connected to the input to said heating means, a fluid passageway in said first condenser for said second working fluid, said fluid passageway being connected to the input to said second turbine, the output of said second turbine being connected to a second condenser for said second working fluid, the output of said second condenser being connected through a fluid pump to said fluid passageway in said first condenser, and means coupling the output of said pump to said first and second bearing means.

7. A binary cycle turboelectric power system comprising a hermetically sealed housing, an alternator and first and second turbines mounted on a shaft in said housing, first and second bearing means for said shaft, said first turbine being adapted to utilize a first working fluid and said second turbine being adapted to utilize a second working fluid, means connected by a conduit to the input to said first turbine for heating said first working fluid, a first condenser for said first working fluid connected by a conduit to the output of said first turbine, a fluid passageway in said first condenser for said second working fluid, said fluid passageway being connected to the input to said second turbine, the output of said second condenser being connected through a fluid pump to said fluid passageway in said first condenser, and means coupling the output of said pump to said first and second bearing means.

References Cited by the Examiner

UNITED STATES PATENTS

| | | | |
|---|---|---|---|
| 2,663,144 | 12/53 | Nordstrom et al. | |
| 3,038,318 | 6/62 | Hanny | 230—116 |
| 3,061,733 | 10/62 | Humpal | 290—52 |
| 3,086,362 | 4/63 | Foster-Pegg | 60—49 X |

FOREIGN PATENTS

| | | |
|---|---|---|
| 163,997 | 5/21 | Great Britain. |
| 636,798 | 5/50 | Great Britain. |
| 659,714 | 10/51 | Great Britain. |

ORIS L. RADER, *Primary Examiner.*

MILTON O. HIRSHFIELD, *Examiner.*